Oct. 23, 1956 A. J. KWAKE 2,768,232
CABLE AND GROUND WIRE CLAMP FOR ELECTRICAL OUTLET BOXES
Filed Sept. 27, 1952

INVENTOR.
ANDREW J. KWAKE.
BY Archworth Martin
his ATTORNEY.

United States Patent Office 2,768,232
Patented Oct. 23, 1956

2,768,232

CABLE AND GROUND WIRE CLAMP FOR ELECTRICAL OUTLET BOXES

Andrew J. Kwake, New Kensington, Pa.

Application September 27, 1952, Serial No. 311,930

4 Claims. (Cl. 174—51)

My invention relates to ground clamps, and more particularly to clamps for securely holding the incoming ends of cables in connecting boxes such as outlet boxes and switch boxes and for grounding the ground wires of the cables to the box, this application being a continuation-in-part of my application Serial No. 165,177, filed May 31, 1950, now Patent No. 2,684,994 issued July 27, 1954.

In connecting cables or conduits to the interior walls of an outlet box or the like, it is somewhat difficult to accurately and positively connect the ground wires to the box in a manner to insure accurate grounding of any current that flows in the ground wire. Usually, the ground wires are wrapped once or twice around the grounding screw, but frequently they become loosened or even disengaged.

My invention has for one of its objects the provision of a clamping and holding device in the form of a clip which will not only connect the conduits to the interior walls of a connecting box, but will also firmly and adequately connect the ground wires thereto, simply through the use of a single screw that is utilized to connect the holding clip for the cables and the ground wires to the box wall.

Another object of my invention is to provide a clamp of the character referred to wherein the ground wires and the clamp are initially held in partly assembled relation and maintain their proper relative positions while placing the clamp in the outlet box and making the permanent connections to the box and the ground wires.

Some of the forms which my invention may take are shown in the accompanying drawing, wherein Figure 1 is a face view of an outlet box or the like, with the cover plate removed and equipped with my invention;

Figure 1:
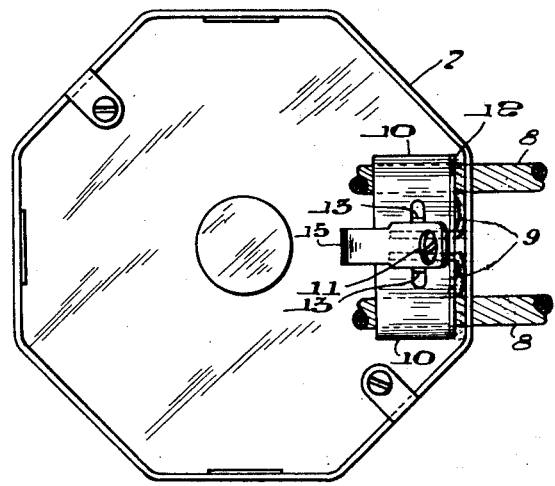
Figure 2:
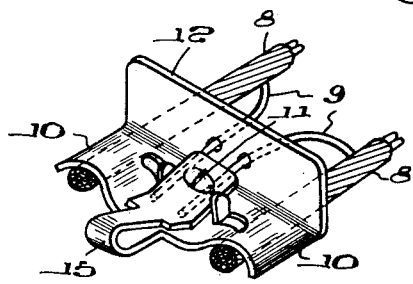
Fig. 2 is a perspective view of the clamping members and the associated wires and cables of Fig. 1.

Referring first to Figs. 1 and 2, an outlet box or switch box 7 may be of any well known conventional form. The lead-in cables or conduits are indicated by the numerals 8 and ground wires by the numerals 9. The clip proper may suitably be of sheet metal and has wing portions 10 that partly embrace the cables 8 to clamp them against the box wall, the clamping force being applied by a screw 11 that has threaded connection with the inner end or bottom wall of the box.

The clamping plate has an upstanding flange 12 having holes through which the ground wires 9 extend. The wires 9 are disposed between lips 13 that are struck up from the body of the clamping plate and beneath a lip or tongue 15 that is bent backwardly from an edge of the clamping plate. The bent-back portion of the tongue is sufficiently close to the body of the clamping plate that when the wires 9 are inserted, they will be frictionally held against displacement, thus facilitating placing of the parts in their proper relative positions. The screw 11 will then be inserted and turned down to tightly clamp the cables in place against the box wall and to clamp the ground wires.

The arrangement has the further advantage that the screw 11 serves to prevent the ground wires 9 from coming into engagement with each other. This is a useful feature, because when one of these wires is of copper and the other of aluminum, as has been common practice during copper shortages, the wires have to be kept separated, since engagement of the copper wire with the aluminum wire would result in rapid deterioration or disintegration of the copper wire.

Figure 3:
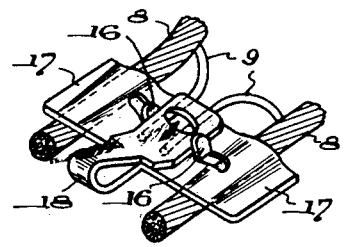
Fig. 3 is a perspective view showing a modification of the structure of Fig. 2.

Referring now to Fig. 3, the clip is similar to that of Fig. 2, in that it has ears 16 struck up therefrom to prevent lateral displacement of the ground wires and has cable clamping wings 17 that correspond to the wings 10 of Fig. 2 and also has a wire-clamping lip 18. In this case, the flange 12 of Fig. 2 is omitted.

Figure 4:
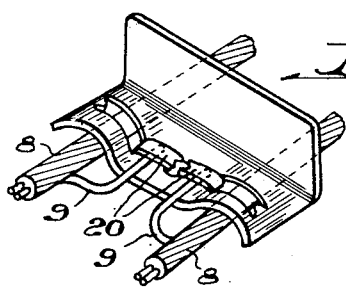
Fig. 4 shows still another modification thereof.

Fig. 4 shows an arrangement wherein lips 20 are struck upwardly from the body of the clamping plate in position to overlie the ground wires 9. The inner ends of these members 20 are recessed somewhat to fit the shank of a screw such as a screw 11 which is used to connect the clamp to a box wall and to cause the lips 20 to grip the ground wires. Here again, the lips 20 will exert some frictional holding force on the ground wires during assembly of the parts and until the attaching screw has been applied.

Figure 5:
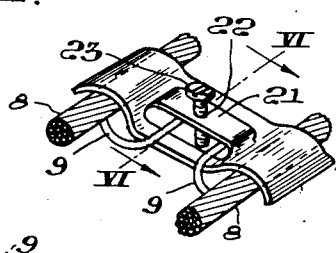
Fig. 5 is a perspective view showing still another form of clamping plate.
Figure 6:
Fig. 6 is a view taken on the line VI—VI of Fig. 5.

In Figs. 5 and 6, the clamping plate differs from the plate of Fig. 4 primarily in the arrangement for gripping the ground wires 9. Here, the central portion of the plate is struck out to form a strap-like lip element 21 that has a hole 22 for receiving an attaching screw 23 which corresponds to the screw 11 of Fig. 1. The ground wires 9 will be inserted beneath the lip 21 and, during insertion, they will be bent or deflected somewhat by the member 21 and thereby be temporarily held in place. The edges of the element 21 are curved or beveled slightly as shown in Fig. 6, as are also the adjacent edges of the body of the plate, so that the ground wires will not have metal scraped therefrom during insertion.

I claim as my invention:

1. The combination with an electrical connecting box having lead-in openings for conductor cables that are provided with ground wires, of a one-piece clip therein having cable-clamping wings positioned to engage laterally-spaced cables in the box and hold them against a wall of the box, a yieldable lip carried by the mid portion of the clip and bent in outwardly-spaced relation thereto at the zone between the wings, the lip having a hole adjacent to its central area and being of sufficient width to overlie ground wires along lines between the wings and said hole, and a clamping screw extending through the lip and the mid area of the clip and having threaded engagement with the adjacent wall of the box, the lip being in the form of a portion partly severed from the body of the clip, along lines transverse to the said wings and pressed outwardly between the slits, to accommodate ground wires between it and the body of the clip.

2. The combination with an electrical connecting box having lead-in openings for conductor cables that are provided with ground wires, of a one-piece clip therein having cable-clamping wings positioned to engage laterally-spaced cables in the box and hold them against a wall of the box, a yieldable lip carried by the mid portion of the clip and bent in outwardly-spaced relation thereto at the zone between the wings, the lip having a hole adjacent to its central area and being of sufficient width to overlie ground wires along lines between the wings and said hole, and a clamping screw extending through the lip and the mid area of the clip and having threaded engagement with the adjacent wall of the box, the lip being in the form of a portion partly severed from the body of the clip, pressed outwardly to accommodate ground wires between it and the body of the clip.

3. Electrical connecting apparatus as recited in claim 1, wherein that portion of the lip between said transverse lines is pressed outwardly a distance less than the thickness of the ground wires, whereby the ground wires will initially be bent somewhat during insertion, so that they will be frictionally held preliminary to applying the clamping screws.

4. The combination with an electrical connecting box having lead-in openings for conductor cables that are provided with ground wires, of a one-piece clip therein having cable-clamping wings positioned to engage laterally-spaced cables in the box and hold them against a wall of the box, a yieldable lip carried by the mid portion of the clip and bent in outwardly-spaced relation thereto at the zone between the wings, the lip having a hole adjacent to its central area and the lip being of sufficient width to overlie ground wires that lie along lines between the wings and said hole, the clip initially being in position to frictionally hold the ground wires against the outer face of said mid portion, preliminary to clamping the lip against the wires, and a clamping screw extending through the lip and the mid area of the clip and having threaded engagement with the adjacent wall of the box.

References Cited in the file of this patent

UNITED STATES PATENTS

| | | |
|---|---|---|
| Re. 18,773 | Thomas | Mar. 21, 1933 |
| 1,542,074 | Mayer | June 16, 1925 |
| 1,611,499 | Vaughn et al. | Dec. 21, 1926 |
| 1,773,572 | Calderwood | Aug. 19, 1930 |
| 1,822,128 | Clayton | Sept. 8, 1931 |
| 1,922,077 | Buchanan | Aug. 15, 1933 |
| 2,554,169 | Bergan | May 22, 1951 |